Sept. 23, 1924.
E. A. CHASE
EDGE TRIMMER FOR STONE BLOCKS
Filed March 29, 1921
1,509,585
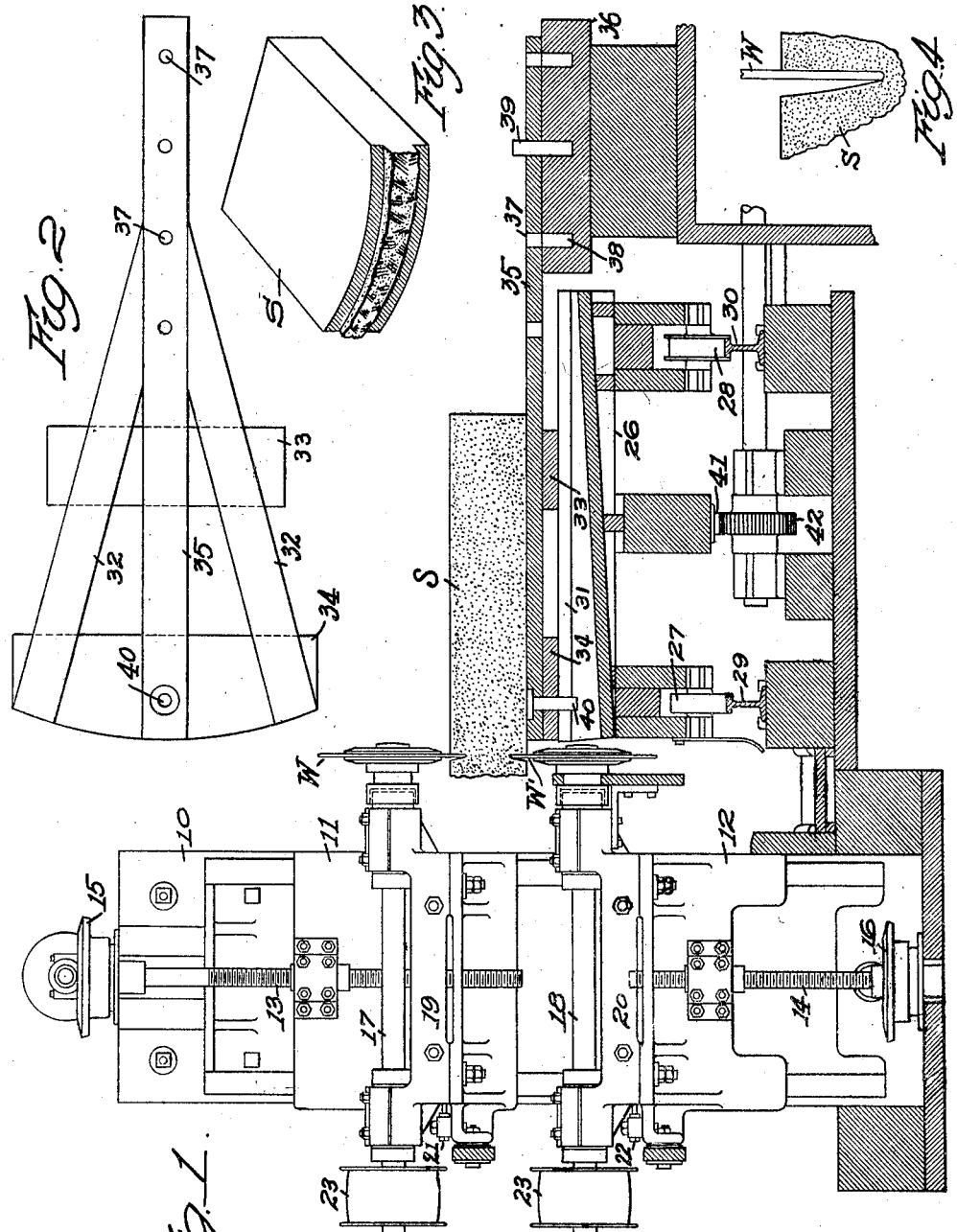
INVENTOR.
ELROY A. CHASE.
BY
Southgate & Southgate
ATTORNEYS Patented Sept. 23, 1924.

1,509,585

UNITED STATES PATENT OFFICE.

ELROY A. CHASE, OF NORTHFIELD, VERMONT.

EDGE TRIMMER FOR STONE BLOCKS.

Application filed March 29, 1921. Serial No. 456,670.

*To all whom it may concern:*

Be it known that I, ELROY A. CHASE, a citizen of the United States, residing at Northfield, in the county of Washington and State of Vermont, have invented a new and useful Edge Trimmer for Stone Blocks, of which the following is a specification.

This invention relates to a machine for trimming or lining a curved edge of a block of granite or other stone. The operation of lining or trimming a stone block, when performed by hand, is laborious and expensive and the production of accurate edges requires a high degree of skill.

It is the object of my present invention to provide improved mechanism for trimming curved edges on blocks of stone, the operation being performed automatically and without the employment of skilled labor.

A further object of my invention is to provide a machine equally well adapted for trimming either curved or straight edges.

With these objects in view, my invention in its preferred form includes a work supporting carriage movable transversely past a grinding wheel, and a supplemental stone support mounted to swing about a fixed pivot while partially supported by said carriage.

My invention further relates to arrangements and combinations of parts which will be hereinafter described and more particularly pointed out in the appended claims.

A preferred form of my invention is shown in the drawings in which

Fig. 1 is an end elevation, partly in section, of my improved edge trimming machine;

Fig. 2 is a plan view of the swinging stone support;

Fig. 3 is a perspective view of a block of stone after being operated upon by the machine; and Fig. 4 is a detail view showing the wheel clearance.

Referring to the drawings, I have shown parts of a grinding machine in end elevation, the machine comprising a frame 10 upon which plates or brackets 11 and 12 are vertically adjustable by two screws 13 and 14 to which are connected bevel gears 15 and 16. These gears may be independently connected to a suitable source of power for separately adjusting either of the bearing brackets 11 or 12 as desired.

Grinding wheels W and W' are mounted on the ends of wheel shafts 17 and 18, each shaft being rotatable in suitable bearings on bearing plates 19 and 20 supported on the brackets 11 and 12. Adjusting screws 21 and 22 are provided for moving the bearing plates 19 and 20 to effect slight axial adjustments of the grinding wheels. The wheel shafts are provided with pulleys 23 for driving belts (not shown). For further details of the grinding machine reference is made to a companion application filed by me on even date herewith, Serial No. 456,671.

A carriage 26 is provided with wheels 27 and 28 and is movable transversely of the shafts 17 and 18 on rails 29 and 30. The wheels 28 are preferably double flanged to guide the carriage along the rail 30. The top of the carriage 26 is formed of cross bars 31 fixed to the carriage but spaced apart to provide a series of parallel transverse grooves.

The swinging stone support 32 is partially supported upon the carriage 26 and is provided with cross pieces 33 and 34 which rest upon the cross bars 31. The main longitudinal member 35 of the support 32 is designed to be pivotally connected to a fixed frame member 36 in different desired relations. For this purpose a series of openings 37 may be provided in the member 35 and an additional series of openings 38 in the fixed frame member 36. A pin or stud 39 inserted in the selected openings 37 and 38 will pivotally connect the support 32 to the fixed frame member 36 so that the support may swing about a desired axis.

A second stud 40 extends through the support 32 into one of the grooves between the bars 31 of the carriage 26. Any suitable provision may be made for moving the carriage 26 back and forth along the rails 29 and 30, such, for instance, as the rack 41 and pinion 42 shown in Fig. 1. The block of granite or other stone S rests upon the upper face of the support 32 and is commonly of sufficient weight to maintain its position thereon without other fastening means.

Having described the construction of my improved machine, the method of operation thereof will be readily apparent. The support 32 and fixed frame member 36 are connected by the stud 39 to provide a selected radius for the proposed edge on the stone S. The wheels W and W' are then adjusted vertically so that they slightly engage the upper and lower surfaces of the stone. The carriage 26 is then reciprocated on the supporting rails, oscillating the support 32 and stone S about the pivot stud 39.

While the stone is thus oscillated in a predetermined arc, the grinding wheels are gradually fed toward each other to cut grooves of the desired depth. After the grooves are cut, the waste material may be broken away by any usual process. The appearance of the stone after this operation is clearly shown in Fig. 3, and Fig. 4 shows the manner in which the wheels clear themselves at the outer side of the cut while making a straight and true vertical finished edge on the inside.

Having thus described my invention, it will be seen that I have provided a very simple and practical mechanism by which curved edges may be cut and finished on blocks of stone.

It will be further evident that changes and modifications may be made in my invention by those skilled in the art without departing from the spirit and scope of the invention as set forth in the claims, and I do not wish to be otherwise limited to the details herein disclosed, but what I claim is:—

1. An edge trimmer for stone blocks having, in combination, a relatively narrow grinding wheel, a wheel shaft, driving means therefor, and means to support a block of stone adjacent said wheel and to move said stone in a curved path past said wheel in a direction substantially transverse to the axis thereof, the axis of movement of said stone being substantially removed from the plane of the grinding wheel along the axis of the wheel shaft.

2. An edge trimmer for stone blocks having, in combination, a grinding wheel, a wheel shaft, driving means therefor, means to support and oscillate a block of stone adjacent said grinding wheel in a direction substantially transverse to the axis of said wheel, and means to relatively adjust said wheel and stone vertically, the axis of movement of said stone being substantially removed from the plane of the grinding wheel along the axis of the grinding shaft.

3. An edge trimmer for stone blocks having, in combination, a grinding wheel and wheel shaft, driving means therefor, bearings for said shaft adjustable vertically toward and from the stone, a support for the stone movable about a fixed pivot in a direction substantially transverse to the axis of said shaft, and means to oscillate said support about its pivot, the pivot of said support being substantially removed from the plane of the grinding wheel along the axis of the driving shaft.

4. An edge trimmer for stone blocks having, in combination, a grinding wheel and wheel shaft, driving means therefor, a carriage movable transversely of the axis of said shaft, and a support for the stone movable about a fixed pivot and having its swinging end supported on said carriage, whereby reciprocation of said carriage effects oscillation of said support, moving the stone block in a circular arc past said wheel and substantially transverse to the axis of said shaft.

5. An edge trimmer for stone blocks having, in combination, a grinding wheel and wheel shaft, driving means therefor, bearings for said shaft adjustable vertically toward and from the stone, a carriage, means to move said carriage transversely of the axis of said shaft, a support for a block of stone movable about a fixed pivot and having its swinging end slidably supported on said carriage, and an operative connection between said support and carriage.

6. An edge trimmer for stone blocks having, in combination, a grinding wheel and wheel shaft, driving means therefor, bearings for said shaft adjustable vertically toward and from the stone, a carriage, means to move said carriage transversely of the axis of said shaft, a support for a block of stone movable about a fixed pivot and having its swinging end slidably supported on said carriage, and a pin and slot connection between said support and carriage.

7. An edge trimmer for stone blocks having, in combination, a grinding wheel and wheel shaft, driving means therefor, a movable support for a block of stone, a fixed frame member, means to pivotally connect said support to said frame member at different points on said frame members and at different selected distances from said grinding wheel, and means to oscillate said support and stone about the selected pivot.

8. An edge trimmer for stone blocks having, in combination, a grinding wheel and wheel shaft, driving means therefor, a movable support for a block of stone, a fixed frame member, means to pivotally connect said support to said frame member at different points thereon and at different selected distances from said grinding wheel, means to oscillate said support and stone about the selected pivot, and means to adjust the grinding wheel axially toward and away from the pivot of said support.

9. An edge trimmer for stone blocks having, in combination, a pair of grinding shafts, wheels on said shafts, bearings for said shafts, the bearings for each shaft being separately and independently adjustable vertically, and means to oscillate a block of stone in a selected curved path between said grinding wheels.

In testimony whereof I have hereunto affixed my signature.

ELROY A. CHASE.